United States Patent
Freedman et al.

(10) Patent No.: US 6,985,458 B2
(45) Date of Patent: Jan. 10, 2006

(54) MULTIPLE BAND LOAD BALANCING SATELLITE COMMUNICATION

(75) Inventors: Jeffery B. Freedman, Laurel, MD (US); Ted M. Kaplan, North Potomac, MD (US)

(73) Assignee: RKF Engineering, LLC, Washington, DC (US)

( * ) Notice: Subject to any disclaimer, the term of this patent is extended or adjusted under 35 U.S.C. 154(b) by 861 days.

(21) Appl. No.: 09/907,508

(22) Filed: Jul. 18, 2001

(65) Prior Publication Data
US 2003/0016634 A1   Jan. 23, 2003

(51) Int. Cl.
  $H04B\ 7/212$   (2006.01)
(52) U.S. Cl. ............... 370/321; 370/347; 370/442; 455/452.2; 455/453; 455/505
(58) Field of Classification Search ............... 370/321, 370/252, 465, 360, 317, 442, 347; 455/12.1, 455/427, 452.1–452.2, 453, 63.3, 504, 505
See application file for complete search history.

(56) References Cited

U.S. PATENT DOCUMENTS

| | | | |
|---|---|---|---|
| 3,676,778 A | * | 7/1972 | Mori .......................... 455/12.1 |
| 5,533,004 A | * | 7/1996 | Jasper et al. ................. 370/204 |
| 5,909,469 A | * | 6/1999 | Frodigh et al. .............. 375/302 |
| 6,141,534 A | * | 10/2000 | Snell et al. ................. 455/12.1 |
| 6,421,357 B1 | * | 7/2002 | Hall ........................... 370/479 |
| 6,445,702 B1 | * | 9/2002 | Wright ....................... 370/389 |
| 6,466,569 B1 | * | 10/2002 | Wright et al. ............... 370/347 |
| 6,763,006 B1 | * | 7/2004 | Lockett ...................... 370/318 |

* cited by examiner

Primary Examiner—Ricky Ngo
Assistant Examiner—Nittaya Juntima

(57) ABSTRACT

The throughput between a satellite and a plurality of users is controlled by adjusting resources among the users depending on the signal degradation (such as rain fade) experienced by the users. A plurality of time division multiplex (TDM) channels (also called bands) each have a plurality of TDM subchannels corresponding to the users. The channels have different signal fade ranges and the users are assigned to channels based on their signal degradations. Users with signal degradations within a range of each other are assigned to different subchannels within a common channel. Those users with downlinks having substantial signal degradation are given a greater packet length or duration for the data packets of their corresponding subchannels. Additionally, the forward error correction (FEC) code rate is adjusted depending on signal degradation. If some downlinks are experiencing extreme signal degradation, their packet lengths can be reduced to zero and the length (i.e., time within the TDM frame) reallocated to other subchannels until conditions improve.

21 Claims, 9 Drawing Sheets

MULTIPLE BAND LOAD BALANCING SATELLITE COMMUNICATION

BACKGROUND OF THE INVENTION

The present invention relates to balancing the load in communication between a central communication center (satellite or other communication center) and a plurality of users that share resources (bandwidth and/or power limited channels). More specifically, the load is balanced by allocating resources between different users based on signal degradation as determined for the different users.

The communication center allocates resources and transmits the signals to the plurality of users. Examples of communications centers include terrestrial cellular Hub stations, gateways that transmit to users through a satellite, and processing satellites. In applications using a satellite channel and for the purpose of this invention, the central communication center can be considered to include both the gateway and the satellite.

Degradation of a user signal may be mitigated by allocating more channel resources to that user. However, in a resource limited channel user requirements including quality of service (QOS) and throughput can not always be satisfied. In a typical communication channel the performance of each user signal is variable from factors including link characteristics, requirements, propagation effects, signal distortion, losses and interference. This invention can be used to optimize the allocation of resources to ensure equitable sharing of the channel by a plurality of users.

Satellite channels are resource limited and user performance is likely to be variable over the satellite beam. In satellite channels operating at very high frequencies (>10 GHz) users located in rain cells can experience very large rain fades, while other users in the same beam may be operating in clear sky. One common method for overcoming these rain fades is to dynamically reduce the data rates of faded users. However, this is an unacceptable solution if the data rate reductions are too severe. For example, if the link to a user is for a satellite telephone service, a severe reduction in the data rate will make the sound quality go down and/or cause some words to be lost in the communication. In an internet data delivery service, severe data rate reductions will result in unacceptable delays to the user.

The satellite beam is usually much larger than the rain cells and therefore, it can be assumed that only a small percentage of users are heavily faded at any particular time. Since there are only a small number of faded users, this invention allows each unfaded user to give up a small portion of the satellite resource, to the faded users, in order to balance the load between the different users and provide a consistent QOS for all users.

Various U.S. patents relating to communications techniques will be discussed.

Gurantz U.S. Pat. No. 4,837,786 discloses a quadrature phase shift transmission arrangement where a satellite communicates with ground stations using two separate transmission channels (one with a higher data rate and one with a lower data rate) on one frequency. The lower data rate channel is used for a ground station when rain fade occurs.

Acampora U.S. Pat. No. 4,495,619 discloses a TDMA system where time slots are allocated on the basis of carrier-to-noise ratio to achieve low rain outage.

Acampora U.S. Pat. No. 4,301,533 discloses a rain margin increasing technique where time slots are dedicated to a beam experiencing a rain fade or similar condition.

Langseth U.S. Pat. No. 4,287,598 shows a satellite arrangement where alternate path (to alternate ground station then via ground cable route) is used for ground stations experiencing rain fade.

Jasper U.S. Pat. No. 5,533,004 is a TDMA system where a modulation technique is selected with blocks formatted into an equal number of information bits.

Hester U.S. Pat. No. 5,355,374 communication system where bandwidth is reallocated as needed.

Other communication system and technique U.S. patents include:

| | |
|---|---|
| Acampora | 4,730,305 |
| Strodtbeck | 5,864,547 |
| Palmer | 5,625,640 |
| Rosen | 5,625,624 |

Communication satellites usually provide service to a large number of customers distributed over a wide geographic area. Since at any given time rainfall rates will vary within this area, the downlink rain fades to each customer will also have a significant variation.

Although many of the prior designs have been generally useful, they have often been subject to one or more of several disadvantages. A severe data rate reduction to a particular user may effectively disable the communications link to that user.

Some techniques rely on excess capacity which is used for particular links that are experiencing difficult conditions, such as heavy rain. However, the excess capacity is wasted when none of the users is experiencing difficult conditions. Alternately, the excess capacity might be utilized to improve signal quality to a higher level than needed. In either case, the excess capacity requires more bandwidth than otherwise.

Some techniques change the signal constellations according to the transmission conditions. However, the capability to operate using different signal constellations substantially increases the complexity of the transceiver systems both at the user end and at the satellite or other communication center.

OBJECTS AND SUMMARY OF THE INVENTION

Accordingly, it is a primary object of the present invention to provide a new and improved technique for balancing the load of a satellite or other communication center transmitted to a plurality of users using multiple bands.

A more specific object of the present invention is to provide load balancing among users based on transmission conditions associated with the users.

Another objective of the present invention is to control the QOS (quality of service) and throughput to all the users of the communications channel regardless of the environmental or operating conditions of each user.

A further object of the present invention is to provide an allocation of data rate reductions among a plurality of users such that the occurrence of severe rate reductions for particular users is avoided or minimized.

Yet another object of the present invention is to provide load balancing among users without requiring great complexity in equipment such as associated with systems adaptable to different signal constellations.

The above and other features of the present invention which will be more readily understood when the following detailed description is considered in conjunction with the accompanying drawings are realized by a method of balancing the load in transmission on a plurality of channels between a satellite and a plurality of users to take into account variations in signal degradation. The steps include: transmitting signals between the satellite and the users in a series of time-division multiplex (TDM) subchannels which collectively make up a frame, each frame corresponding to one of the channels, each channel having a plurality of the subchannels, each subchannel constituting a link with a signal, and, at a given time, each TDM subchannel having an associated packet length, code rate, and symbol rate. The signal degradation associated with each TDM subchannel then being used for a corresponding one of the users is determined, the signal degradation for a given TDM subchannel being dependent on a corresponding path between a satellite and the corresponding one of the users. Assignment of the users to the channels is changed based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the different channels. Preferably, there are different code rates on the subchannels. The signals are transmitted from the satellite to the users via downlink paths, each using a downlink TDM subchannel. The preferred method includes dropping any user TDM downlink subchannel having a signal degradation greater than a limit and reassigning the packet length(s) associated with any dropped downlink to TDM subchannels corresponding to still active downlinks. The transmitting step uses the same symbol rate for all subchannels within a channel at any given time.

In another aspect, the method includes the step of selecting the number of channels and their symbol rates necessary to overcome the range of signal fade degradations in the environment and determining the number of channels and the symbol rates so that each TDM subchannel within a channel can adjust their packet length to accommodate a code rate change at a desired level of quality in those TDM subchannels.

The method includes the steps of adjusting the symbol rates for the channels dependent on the signal degradations, selecting one or more TDM subchannels for adjustment dependent on the determined signal degradation for the TDM subchannels; and adjusting the TDM subchannels within each channel, and wherein the adjusting step includes decreasing the code rate and increasing the packet length of one or more TDM subchannels as needed to maintain a first desired level of quality in those TDM subchannels, the increased packet lengths being obtained by the step of decreasing packet lengths in other TDM subchannels, which TDM subchannels can accommodate the decreased packet lengths without falling below a second desired level of quality.

The step of increasing the packet length is performed in conjunction with decreasing the corresponding code rate(s) and wherein the step of decreasing the packet length is performed in conjunction with increasing the corresponding code rate(s).

The symbol rate for each channel is adjusted depending on the signal degradations. The transmitting step uses the same symbol rate for all subchannels within a channel at any given time. Each channel has a corresponding degradation range that is fixed. Alternately, each channel has a corresponding degradation range that is adjusted dependent on signal degradations.

In another aspect, the invention further includes the steps of selecting one or more TDM subchannels for adjustment dependent on the determined signal degradation for the TDM subchannels; and adjusting the TDM subchannels within each channel, and wherein the adjusting step includes increasing the packet length of one or more TDM subchannels as needed to maintain a first desired level of quality in those TDM subchannels, the increased packet lengths being obtained by the step of decreasing packet lengths in other TDM subchannels, which TDM subchannels can accommodate the decreased packet lengths without falling below a second desired level of quality.

The present invention may alternately be described as a method of balancing the load in transmission on a plurality of channels between a communication center and a plurality of users to take into account variations in signal degradation associated with each of the users. The steps include: transmitting signals between the communication center and the users in a series of time-division multiplex (TDM) subchannels which collectively make up a frame, each frame corresponding to one of the channels, each channel having a plurality of the subchannels, each TDM subchannel constituting a link with a signal and associated with at least a corresponding one of the users at a given time, and, at a given time, each TDM subchannel having an associated packet length, code rate, and symbol rate; determining the signal degradation associated with each TDM subchannel then being used for the corresponding one of the users, the signal degradation for a given TDM subchannel being dependent on a corresponding link path; and changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the different channels and different code rates on the channels.

The method further includes selecting one or more TDM subchannels for adjustment dependent on the determined signal degradation for the TDM subchannels; and wherein the adjusting step includes increasing the packet length of one or more TDM subchannels as needed to maintain a first desired level of quality in those TDM subchannels, the increased packet lengths being obtained by the step of decreasing packet lengths in other TDM subchannels, which TDM subchannels can accommodate the decreased packet lengths without failing below a second desired level of quality. The method includes each channel having a corresponding degradation range that is fixed. Alternately, each channel has a corresponding degradation range that is adjustable dependent on the signal degradations. The communication center is a satellite; and the transmitting step is transmission from the satellite to the plurality of users. The symbol rates for the channels are adjusted dependent on the signal degradations.

The invention may alternately be described as a method of balancing the load in transmission on a plurality of channels between a communication center and a plurality of users to take into account variations in signal degradation associated with each of the users. The steps include: transmitting signals between the communication center and the users in a series of time-division multiplex (TDM) subchannels which collectively make up a frame, each frame corresponding to one of the channels, each channel having a plurality of the subchannels, each subchannel constituting a link with a signal and corresponding at a given time with at least one of the users, and, at a given time, each TDM subchannel having an associated packet length, code rate, and symbol rate; determining the signal degradation associated with each TDM subchannel then being used for the corresponding one of the users, the signal degradation for a given TDM subchannel being dependent on a corresponding link path between the communication center and the corresponding one of the users; changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the different channels; determining the optimal symbol rate for each channel based on the determined signal degradations; and transmitting signals between the communication center and the users in the TDM subchannels using the symbol rates determined for each of the channels, the symbol rates for all TDM subchannels in a channel being equal at a given time.

Preferably, the communication center is a satellite. The transmitting step is transmission from the satellite to the plurality of users. The method further includes the step of selecting one or more TDM subchannels for adjustment dependent on the determined signal degradation for the TDM subchannels; and wherein the adjusting step includes increasing the packet length of one or more TDM subchannels as needed to maintain a first desired level of quality in those TDM subchannels, the increased packet lengths being obtained by the step of decreasing packet lengths in other TDM subchannels, which TDM subchannels can accommodate the decreased packet lengths without failing below a second desired level of quality. The method further includes the step of dropping any link having a signal degradation greater than a limit and reassigning the packet length(s) associated with any dropped link to TDM subchannels corresponding to still active links. The method further includes the step of adjusting packet lengths of subchannels within each channel based on the signal degradations of the subchannels.

The present invention may alternately be described as a system for balancing the load in transmission between a communications center and a plurality of users to take into account variations in signal degradation associated with each of the users and including: at least one transmitter operable to transmit signals between the communications center and the plurality of users, the signals being on multiple channels, each channel having a series of time-division multiplex (TDM) subchannels which collectively make up a frame, each subchannel constituting a link, and, at a given time, each TDM subchannel having an associated packet length, forward error correction rate, and symbol rate; a degradation determiner operable to determine the signal degradation associated with each TDM subchannel, the signal degradation for a given TDM subchannel being dependent on a corresponding link path; and a channel assignor that is operable to assign users to channels based on signal degradations with users grouped together on a channel when their signal degradations are within a degradation range corresponding to the channel, there being a signal degradation range corresponding to each of the channels at a given time, each user being assigned to a corresponding subchannel within that user's corresponding channel at a given time.

The communications center is preferably a satellite having a plurality of transponders serving as the at least one transmitter and as additional transmitters and the link paths are downlink paths.

The channel assignor and plurality of transponders are operable such that there is a signal degradation range corresponding to each of the channels at a given time and such that there are different symbol rates on the different. The plurality of transponders are operable to provide different code rates, the code rate for a given user being dependent on the signal degradation associated with that user at a given time. The system further includes a code rate assignor operable to assign different code rates to users such that the code rate for a given user is dependent on the signal degradation associated with that user at a given time.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
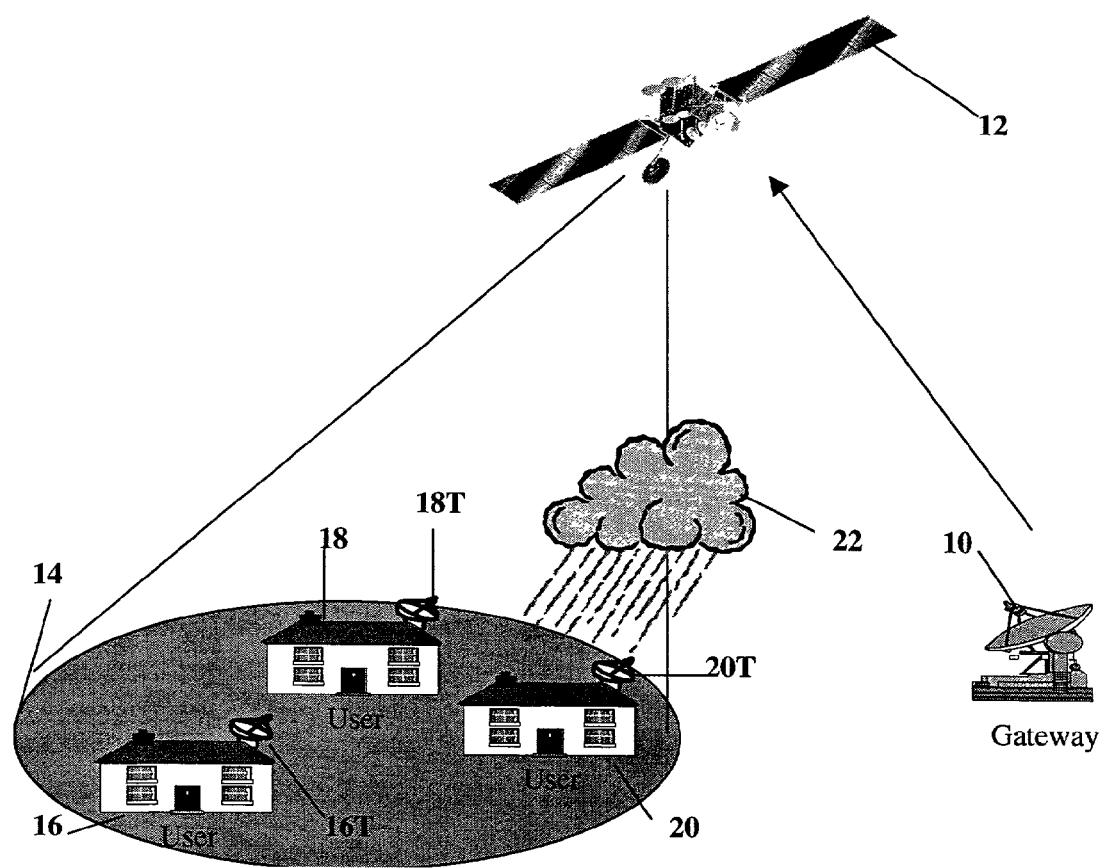
FIG. 1 is a simplified illustration of the present invention showing a satellite relaying communications between multiple users and a gateway.

FIG. 1 shows a satellite configuration using the present invention. A single gateway 10 transmits a signal through a bent pipe satellite 12 to a specific coverage area 14 having users 16, 18, and 20 therein. The satellite 12 communicates with users 16, 18, and 20 (each having corresponding user terminals, 16T, 18T, and 20T) by using different subchannels within a time division multiplex (TDM) stream of packets. There are multiple bands or frequency channels, each having subchannels. All of the subchannels in a particular band or frequency channel together constitute a frame. As shown in FIG. 1, a rainstorm 22 is in between user 20 and the satellite 12. Therefore, the rain fade (or other signal degradation) between satellite 12 and user 20 is likely to be greater than for the downlinks to users 16 and 18. The present invention advantageously adjusts to such changing conditions.

In the present invention the channel is divided into multiple bands or frequencies. Users are assigned a time division multiplex (TDM) subchannel on a specified frequency. At each frequency the subchannels are able to overcome a range of signal degradations. Users are sorted by degradation and assigned appropriate frequencies to adapt to the degradation.

Figure 2:
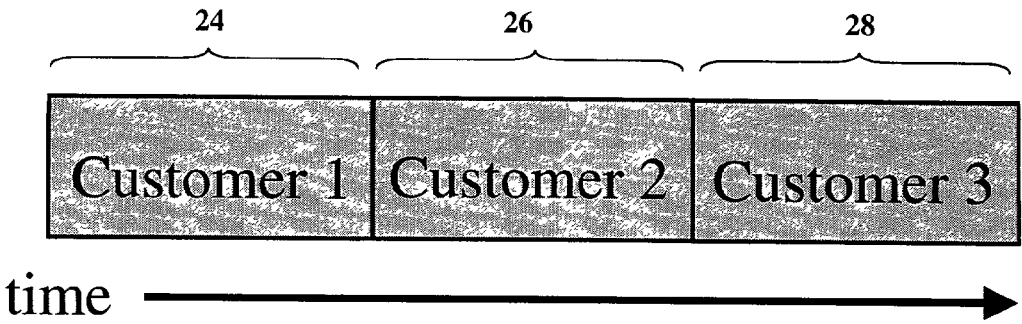
FIG. 2 is an illustration of time division multiplex (TDM) subchannels within a time frame.

Turning now to the simplified illustration of FIG. 2, describing a single TDM channel, and considering users 16, 18, and 20 from FIG. 1 as respectively being customers 1, 2, and 3, the customers have corresponding data packets 24, 26, and 28, which collectively make up a frame. Although only 3 data packets corresponding to 3 TDM subchannels are shown, it will be understood that in practice a much larger number of subchannels would normally be used. Associated with each packet is a packet length, forward error correction (FEC) rate (also called coding rate, but only the packet lengths are visible in FIG. 2). Each band uses a constant symbol rate at a given time. The bands may each have a different constant symbol rates such that each channel has a different rain compensation dynamic range. Although a given band may have a constant symbol rate over time, the invention alternately may have a symbol rate on a band that changes over time. As shown and when all downlinks are experiencing about equal signal conditions (equal fade or other degradation), the packet lengths are all equal, this corresponding to a default condition for the various users with equal FEC. (An alternative, not shown, might have some customers getting more resources and corresponding higher quality even when all links have the same conditions.)

For the preferred embodiment, a command packet is transmitted periodically at a predefined time interval. The command packet is used to instruct the user terminals to change their current configuration. This configuration includes their packet's time slot, coding rate and/or the symbol rate. As will also be discussed below, it will tell the user terminals which of the multiple bands to use.

Either the user terminal or the gateway or the satellite must measure the user's down link fade (and/or other channel degradations). If the user terminal calculates the fade depth, then this information must be relayed back to the gateway in a return channel. The method mitigates the effects of this downlink fade. The uplink fade (i.e., gateway 10 to satellite 12 in FIG. 1), affects all users and can be mitigated using power control, i.e. increasing the power to overcome increased attenuation.

A variety of well-known techniques can be used to estimate the downlink fade. For example, the amount of the fade can be approximated at the user terminal by tapping into the distance metrics of the error correcting code to determine a pseudo bit error rate. This is a measure of the number of errors actively being corrected by the error correction system. From this pseudo bit error rate an estimation of the fade can be determined.

The gateway (or alternately the satellite) determines the appropriate mitigation that needs to be done in order to close the links to each user. User terminals with extremely deep fades (i.e., beyond the range of fade that any of the multiple bands are associated with as explained below) may be dropped in order to maintain the desired quality of service for the rest of the users. However, an important feature of the present invention is to move users among multiple bands, each band having users with a fade within a dynamic range associated with the band. Thus, two users with a slightly different fade would use subchannels within the same band. If one of the users experiences a change in fade that puts the fade outside the dynamic range of that first band, that user would be shifted to a subchannel on a band for users with greater or less fade (as the case is) than that first band. Within each band, the coding rate is preferably adjusted as discussed to take into account variations in fade that are within the dynamic range associated with that band. Link mitigation is performed by coding rate adjustment for each packet. The command packet's code rate is chosen sufficiently low that it can be received reliably by all users.

In this invention each frequency channel represents a different fade group. The number of frequency channels may be defined ahead of time, but can also be chosen dynamically depending on signal fade depth and on the number of fade groups required. For example, during clear sky conditions only one fade group is required and this channel could use the entire satellite band in order to maximize capacity. In fade conditions the satellite channel could dynamically divided into sub-bands to provide the required number of fade groups.

In order to share the mitigation burden all users' throughput on a given band is diminished slightly to avoid or minimize undue signal quality decreases to users experiencing significant rain fade or other degradation). The time duration of the packets is reallocated to that shown in FIG. 3 with packets 24', 26', and 28'. Packets, such as 28' corresponding to a TDM subchannel experiencing significant fade or other degradation, have increased length or duration and are transmitted at lower coding and data rates (i.e., FEC rate). Packets, such as 26' corresponding to a TDM subchannel experiencing no significant fade or other degradation, have decreased length or duration and are transmitted at higher coding rates. Packets, such as 24', may have packet lengths, and coding rates intermediate to the packets 26' and 28'. In this way, and in the preferred embodiment, the number of bits transmitted to each is consistent no matter what rain fade they experience. The overall throughput of all users may decline slightly as a result but most or even all users are guaranteed service.

Figure 3:
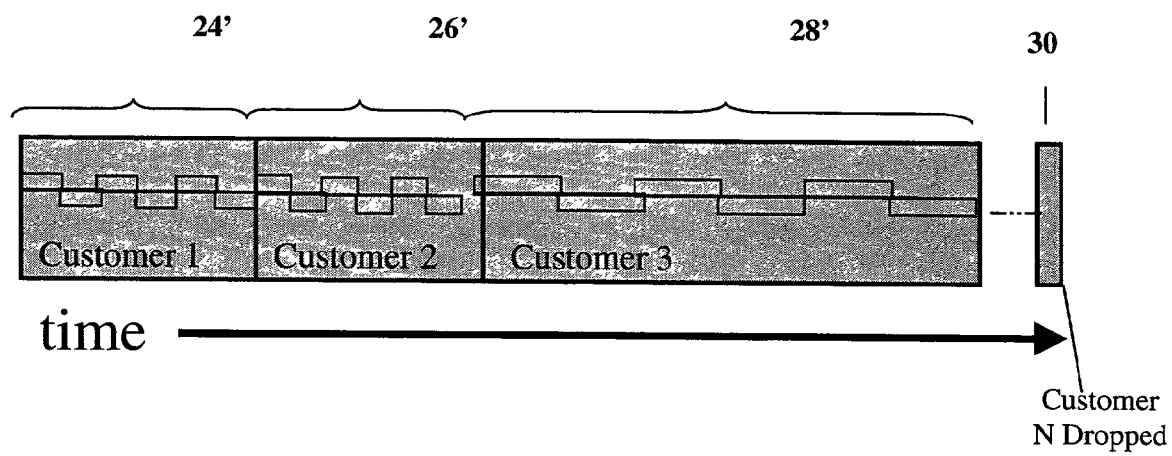
FIG. 3 is an illustration of the TDM subchannels rearranged using the present technique.

FIG. 3 also indicates schematically at 30 that a customer N has been dropped. This is an optional feature of the present invention that may be used when a particular customer has a downlink with great rain fade or other signal degradation. When the degradation is too great to overcome on any of the multiple bands without substantially diminishing the throughput to all the other users, the technique may drop a particular user by reducing that user's packet length to zero (represented at 30 in FIG. 3) until the conditions have improved. Depending on the contracts with the various users, the option of dropping particular users may not be available for all users. Additionally, and although the preferred technique involves the transmission of an equal number of bits to each user, there could alternately be different classes of users with some getting higher throughputs and/or more reliable service than others.

Figure 4:
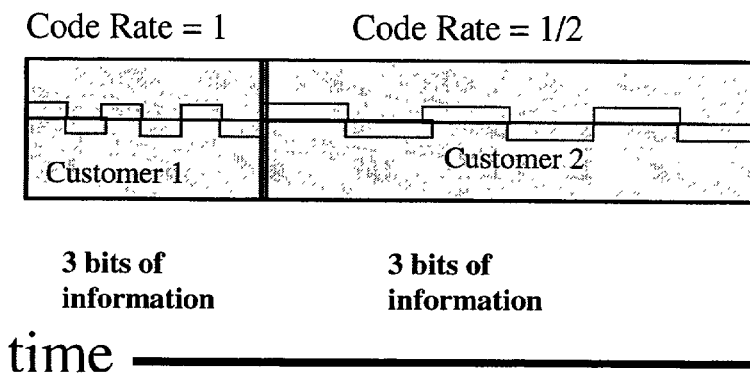
FIG. 4 is an illustration of adjusting the forward error correction (FEC) code rate (also called coding rate)
Figure 5:
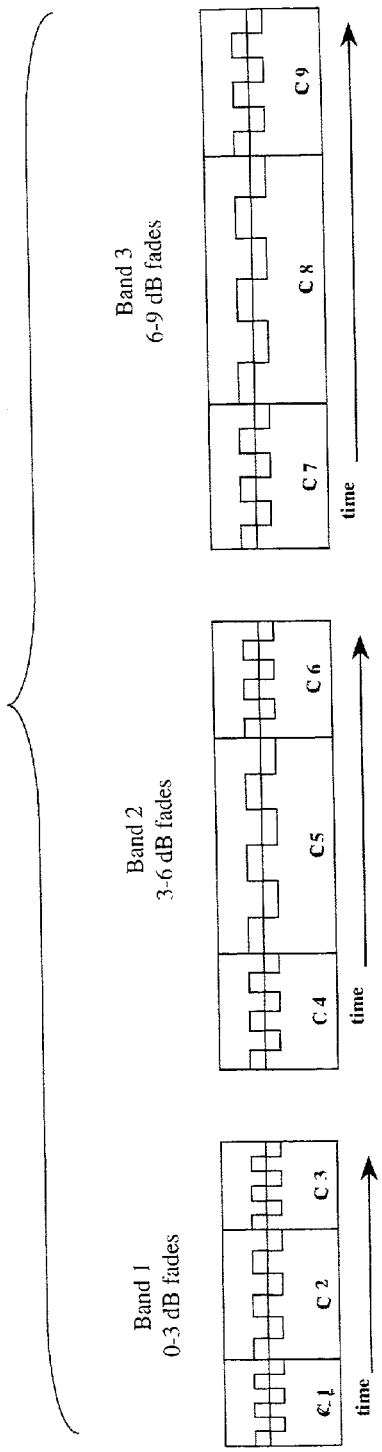
FIG. 5 is an illustration of a distribution of users among three different bands (also called channels)

FIG. 4 is a schematic illustration of a situation where packet length variations between customer 1 and customer 2 are accommodated by changing the FEC rate (also called code rate). This assumes that both of the customers have a fade within the dynamic range of a given band. A customer with a shorter packet length has a higher code rate, whereas one with a longer packet length (corresponding to greater fade in the link) has a lower code rate in that more of the transmitted bits are used for error correction. The packet length variations within a given band are associated with variations in code rate (FIG. 4). In the preferred embodiment described here each band has a constant symbol rate. However an implementation can be devised where the symbol rates for each band can be varied on a subchannel basis. t Turning now to FIG. 5, the allocation of users among multiple bands will be described for the case where each band is assigned a different constant symbol rate. As shown, there are three bands: band 1 is for users with 0 to 3 dB fades, band 2 is for users with 3 to 6 dB fades, and band 3 is for users with 6 to 9 dB fades. It will of course be understood that, in practice, there may be more than 3 bands, each having an associated range of fades that it may adjust for. The range of fades that can be accommodated by a band is a function of the bands symbol rate and the code rates that are implemented. Each band in FIG. 5 is shown with a different symbol rate. Bands that can overcome higher fades will have a lower symbol rate and implement equal or lower code rates. Therefore, band 3 uses a lower symbol rate than bands 1 or 2.

In FIG. 5, customers are indicated as C1, C2, etc. Customers C1, C2, and C3 are on different subchannels within band 1, customers C4, C5, and C6 are on different subchannels within band 2, and customers C7, C8, and C9 are on different subchannels within band 3. The different packet lengths in each band are a result of using different code rates for each customer. The conditions of FIG. 5 correspond to customers C1, C2, and C3 having similar fades, customers C4, C5, and C6 having similar fades, and customers C7, C8, and C9 have similar fades. When the distribution of fades for those customers has changed, the customers may implement a different code rate within the same band or they may be re-assigned a link or subchannel within another band.

Figure 6:
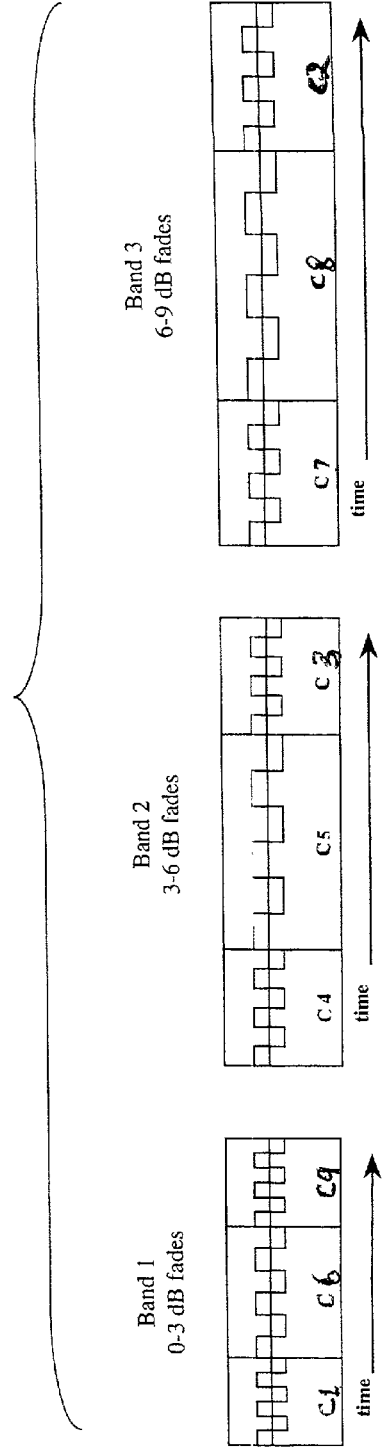
FIG. 6 is an illustration of the distribution of users among the three different bands under changed conditions.

FIG. 6 shows an example where the fade has decreased for customers C6 and C9 and increased for customers C2 and C3. Customer C6 now has less than a 3 dB fade and is, accordingly, moved to band 1. Customer C9 has been moved from band 3 to band 1 as the corresponding fade has dropped below 3 dB. Customers C2 and C3 are now assigned respectively to subchannels within bands 3 and 2 to correspond with their new fade values. Notice also that although C4, C5 and C8 have not been moved to a new band, their code rate has changed to accommodate slight changes in their fade values.

Figure 7:
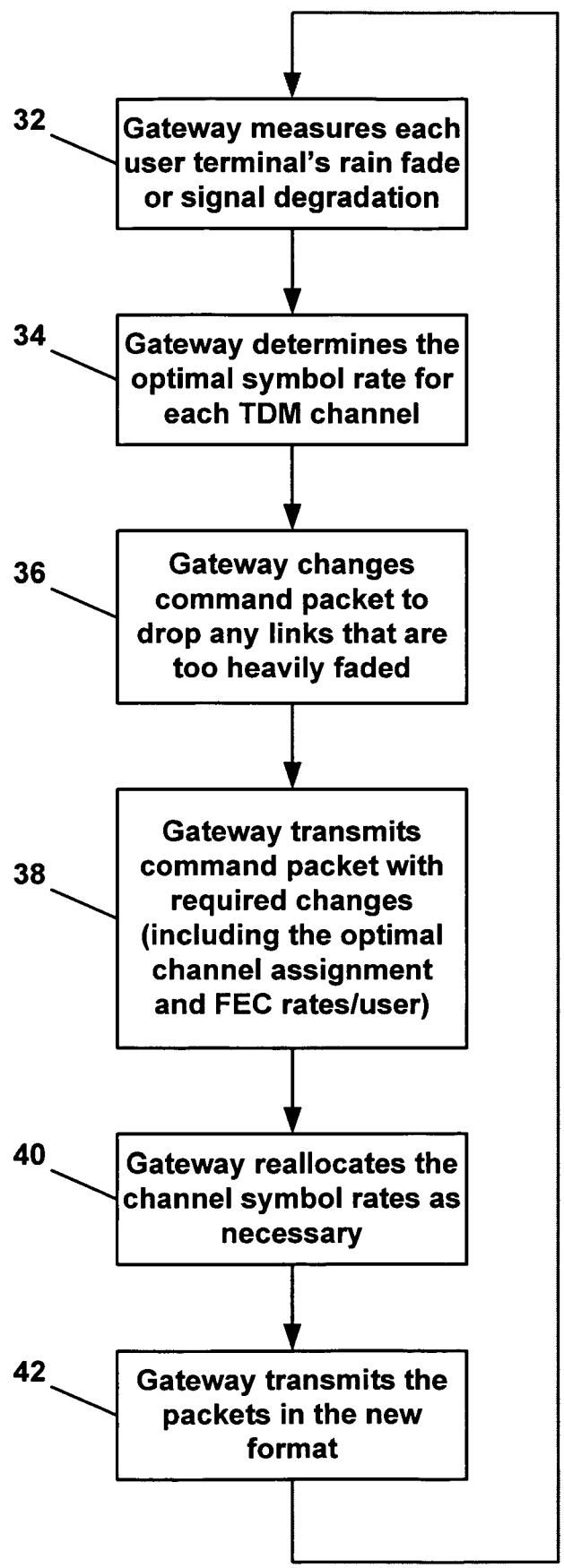
FIG. 7 is a flow chart showing some of the basic concepts of the present invention relative to the allocation of resources by steps taken at a gateway;.

The gateway flow diagram for the invention is illustrated in FIG. 7. In particular, block 32 involves the gateway determining the signal degradation (rain fade or otherwise) for each user. (Alternately and as will be discussed below, the fade for each user could be sent to the gateway from the user's terminal and via the satellite.) At block 34, the gateway determines the optimal symbol rate for each band. The preferred embodiment uses a single symbol rate for all subchannels within a given band, but that symbol rate may vary over time depending on conditions. Thus, and referring back to the three bands of the FIGS. 5 and 6 example, block 34 would set the symbol rates for each of the three bands. Next, block 36 changes the command packet to drop any links that are too heavily faded. In particular, the fade or signal degradation is compared to a given value. If the degradation is greater than the given value, that link may be dropped such that resources are not devoted to a link that cannot be maintained without causing an unacceptably large decline in the quality of service provided to other customers. The degradation value at which the link is dropped could be a fixed value or could be adjusted to depend on the fade or degradation values of other links. For example, if a single link is heavily faded, but the other links have low degradation values, the packet lengths can be reduced for the other links without reducing their quality to an unacceptable level. However, if five of the links have the same heavy fading such that compensating may reduce the other links to an unacceptably low level, all five or some of the heavily degraded links might be dropped.

To ensure that all users receive the command packet, even during a heavy rain fade, it must be extremely robust and would, therefore, be transmitted at the lowest FEC rate and lowest symbol rate. At block 38, the gateway transmits command packets with all the required changes. The command packets, which can be sent every so often, instruct the various user terminals as to their subchannel and band assignment, packet lengths, symbol, and coding rates. Each user terminal would stay at its assigned subchannel and band until it was changed in response to changes in the distribution of fades for the various users or customers.

At block 40, the gateway then allocates the symbol rates to the different channels (i.e., channel or band with the subchannels). Momentarily referring back to FIGS. 5 and 6, the three bands could each have fixed ranges of degradation or fade with band 1 covering 0 to 3 dB, band 2 covering 3 dB to 6 dB, and band 3 associated with 6 dB to 9 dB fade. If a given link to a user terminal has greater than 9 dB fade, that link could be dropped. As an alternative to the fixed fade range associated with each band, the bands could have fade ranges that change as conditions change. Assume, for example, that three users have fades of 0 to 4 dB, three users have fades of 4 dB to 8 dB, and three users have fades of 8 to 12 dB. The first three users could be assigned to band 1 covering fades of 0 to 4 dB, the second three users could be assigned to band 2 covering fades of 4 to 8 dB, and the last three users could be assigned to band 3 covering fades of 8 to 12 dB. Symbol rates would be assigned such that even the subchannel with the highest fade within a band could properly convey the data. In other words, each channel has its symbol rate assigned based on the maximum fade for the customers assigned to the subchannels within that channel.

Although the discussion has assumed three channels or bands, each having three subchannels, in practice a larger or smaller number of channels with a larger or smaller number of subchannels could be used. Further, some bands could have more subchannels than other bands so as to best match the normal distribution of fades to the distribution of channels and subchannels that are available.

Continuing the FIG. 7 process, block 40 leads to block 42 where the gateway resumes transmission of the data packets using the determined values of packet lengths, symbol, and coding rates. After a given time interval, the fades (or other degradations) are again determined by block 32 with the process repeating itself. Those links which may have been dropped during one pass may be reestablished at block 34 during a subsequent pass if conditions have improved sufficiently.

Figure 8:
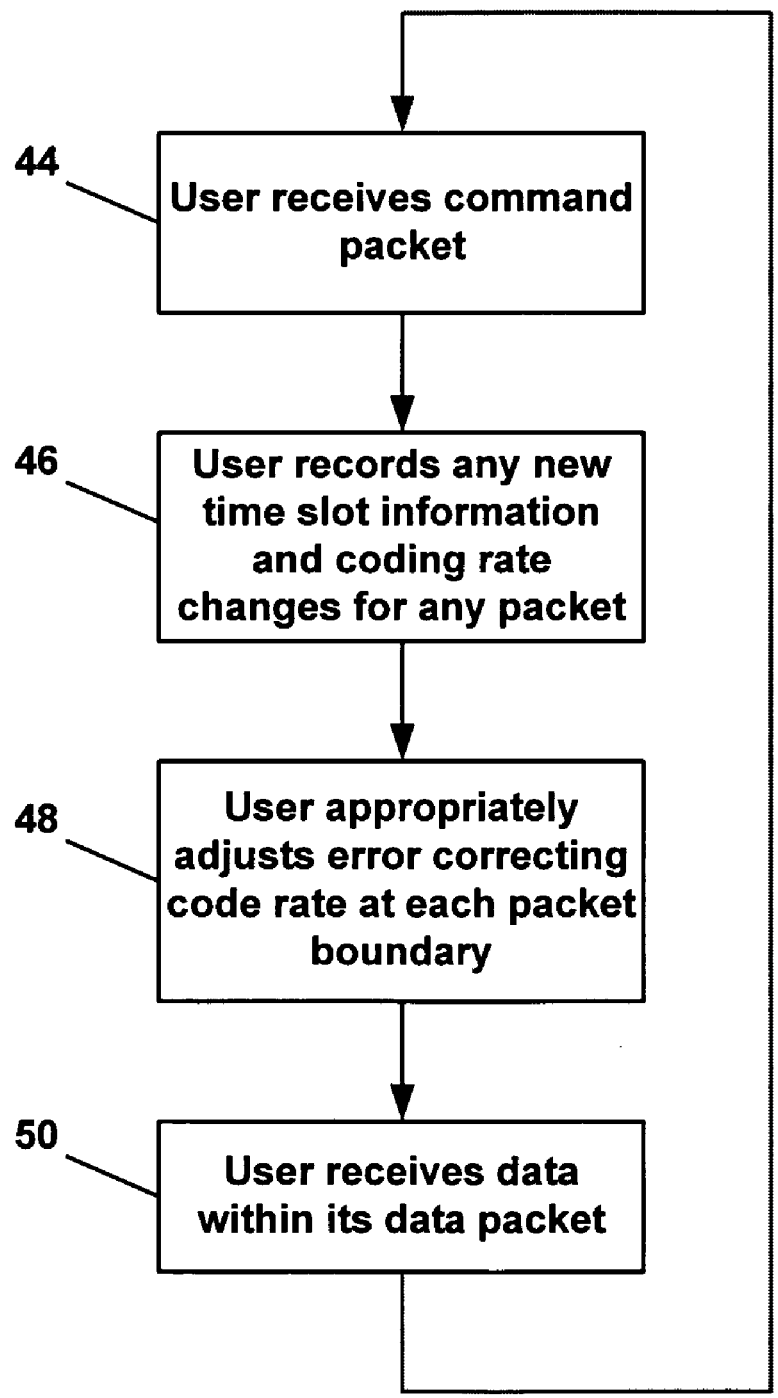
FIG. 8 is a flow chart of the user terminal operation.

FIG. 8 is a flow chart of the user terminal operation. User terminals that experience deep fades can not maintain a carrier tracking lock on a channel transmitting at an overly high symbol rate. Therefore, in order to accommodate a large dynamic range of rain fades the user terminal must re-acquire the channel every time the command packet or their assign packet is received. At block 44, the user terminal acquires the command packet in the TDM subchannel of the channel that it was last assigned to, this corresponding to a given time slot. At block 46, the user terminal will, upon detecting its identifying code, acquire its specified packet length, time slot, symbol rate (preferably this can be known, simply by knowing which channel the user has been assigned to), and coding rate for the user. At block 48, the terminal then acquires the channel to which it has been assigned and the subchannel at the start of its data packet and adjusts its error correcting code. If the terminal had been reassigned to a new channel, block 48 would cause it to switch to the new channel. At block 50, the user terminal receives the data with its data packet. Although not separately shown, it would then decode the data based on the coding rate and symbol rate sent to it via the command packet. The process repeats itself when a new command packet for that user is received. Note that the command packets are transmitted only so often, whereas the usual transmission is of data packets.

The FIG. 8 arrangement uses adaptive coding based on the fade or other degradation within a band and uses adaptive symbol rate when moving users between bands. The symbol rates within a band are generally held constant. However, based on changes in fade dynamics the gateway may decide to change the fade adaptation ranges, within a band, by reassigning symbol rates and/or by changing the number of bands in the channel, The technique uses adaptive coding rates to allow each packet to have a different error correcting coding rate and therefore a different link margin. Adaptive coding can be done using a well know coding scheme called punctured coding. The coding rate of a punctured code can change dynamically during a single data stream. Therefore, all the user terminals will receive all the symbols. Users experiencing deeper fades will have higher bit error rates than those with lower fades. However, the user's packet will be coded so that they can receive their packets at the desired bit error rate.

One limitation of this method is that a single channel can only handle a limited dynamic range of fades. If a user terminal's fade is too severe then it will lose carrier tracking and will be lost. To solve this problem the symbol rate of the entire channel can be reduced so that no user will lose its carrier tracking.

If multiple TDM signals are available in the same coverage area then users with similar fades can be grouped together in the same channel. This allows the system to support a larger dynamic range of fade conditions.

In order to reduce the overhead associated with this method, several user's signals who all experience a similar fade can be grouped into a single packet. Identifying headers can be used to differentiate the user's signals within a packet.

Customers with variable quality of service requirements can be supported by reallocation of resources. For example, packet durations can be adjusted so that a specific user will never experience a throughput reduction. If that user's symbol or coding rate, is reduced then its packet duration is proportionally increased so that a constant throughput is maintained. However, other users within in the channel must reduce their throughput to compensate. This technique will effectively improve some user's quality of service at the expense of other user's quality of service.

Figure 9:
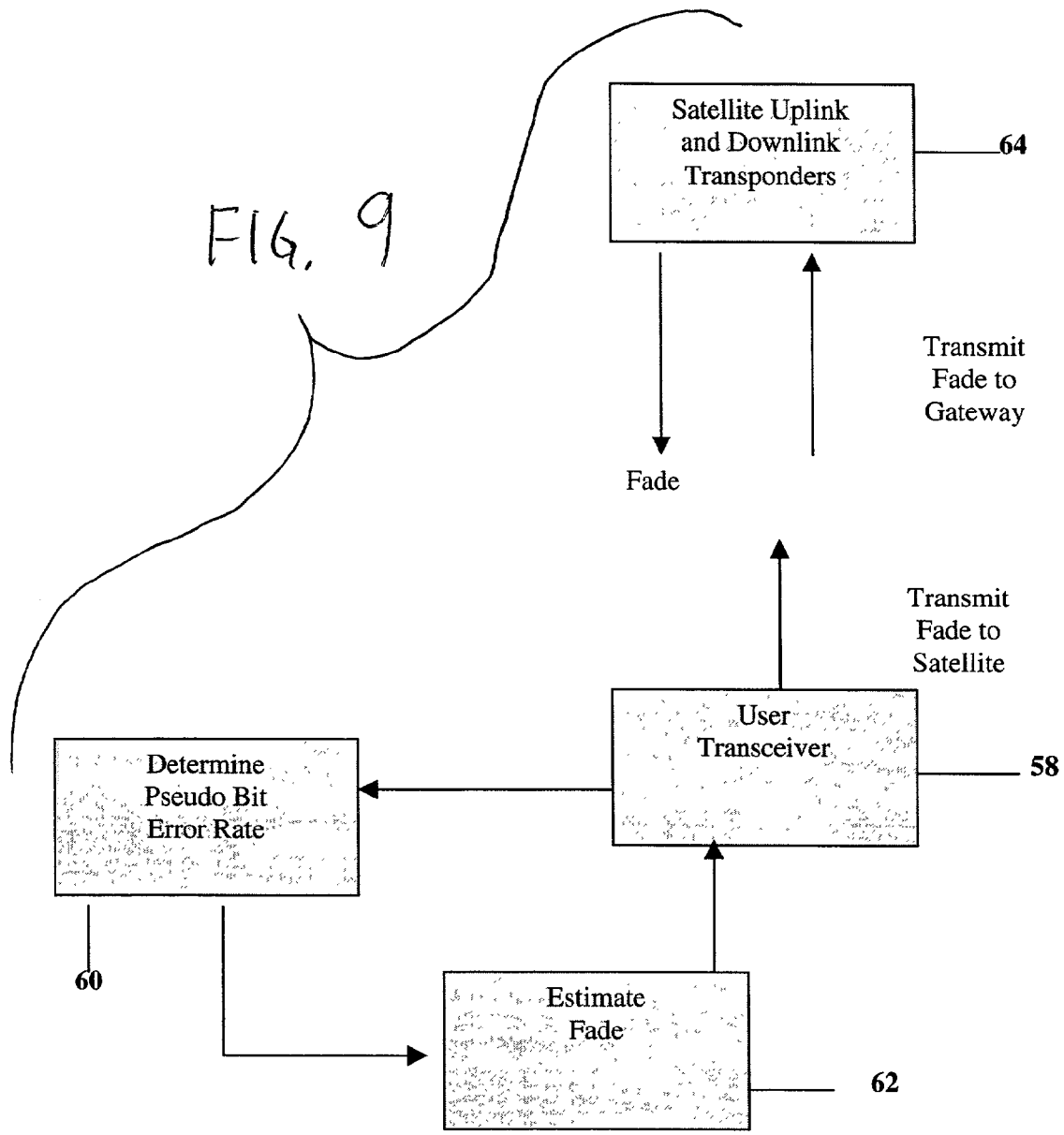
FIG. 9 is a schematic of a satellite and user terminal showing one technique for determining signal degradation.

Turning now to FIG. 9, a first technique for determining fade is shown. This technique operates at the user transceiver 58 (more generally user terminal). In particular, the distance metrics of the error correcting code are tapped to determine a pseudo bit error rate at error rate determiner 60. The error rate is then fed to fade estimator 62 (more generally a degradation determiner) which supplies a fade value (more generally a degradation determiner) then transmitted by transceiver 58 to the satellite. At the satellite, its downlink transponder 64 relays the fade received from user transceiver 58 by transmitting it down to a gateway (not shown in FIG. 9).

Figure 10:
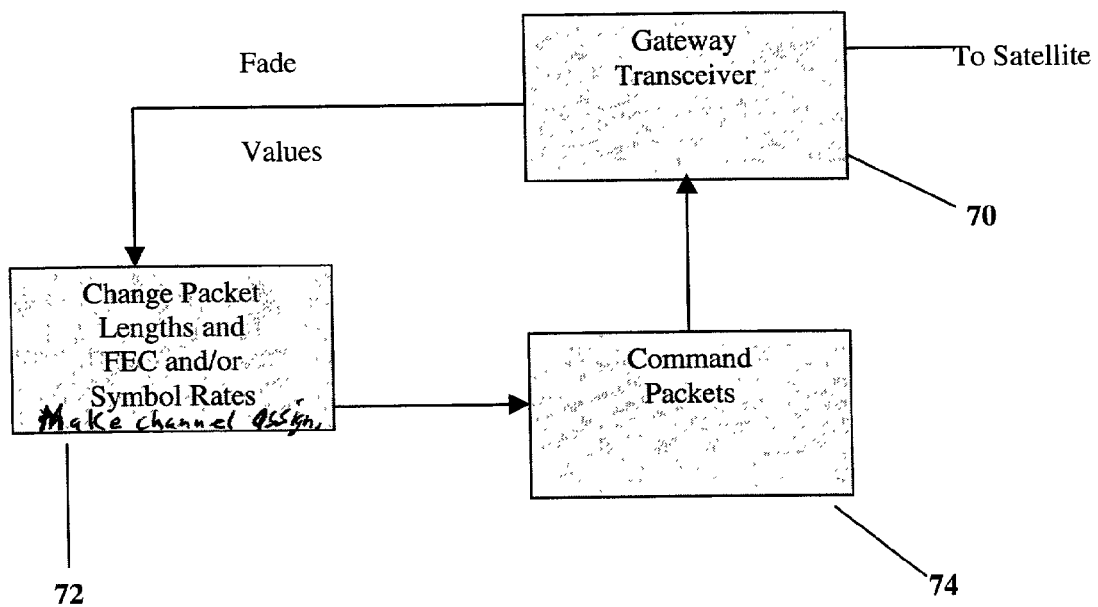
FIG. 10 is a schematic of a gateway also showing an alternate technique for determining signal degradation.

Turning now to FIG. 10, the gateway transceiver 70 receives the fade values and supplies them to the change block 72 which assigns user terminals to channels according to their fades. Additionally, block 72 changes packet lengths and FEC rates so as to allocate resources among the various TDM subchannels. Block 74 generates the command packets, which are supplied to transceiver 70 for transmission to the users via the satellite. The command packets would be transmitted every so often, with the transceiver 70 usually transmitting data packets.

Figure 11:
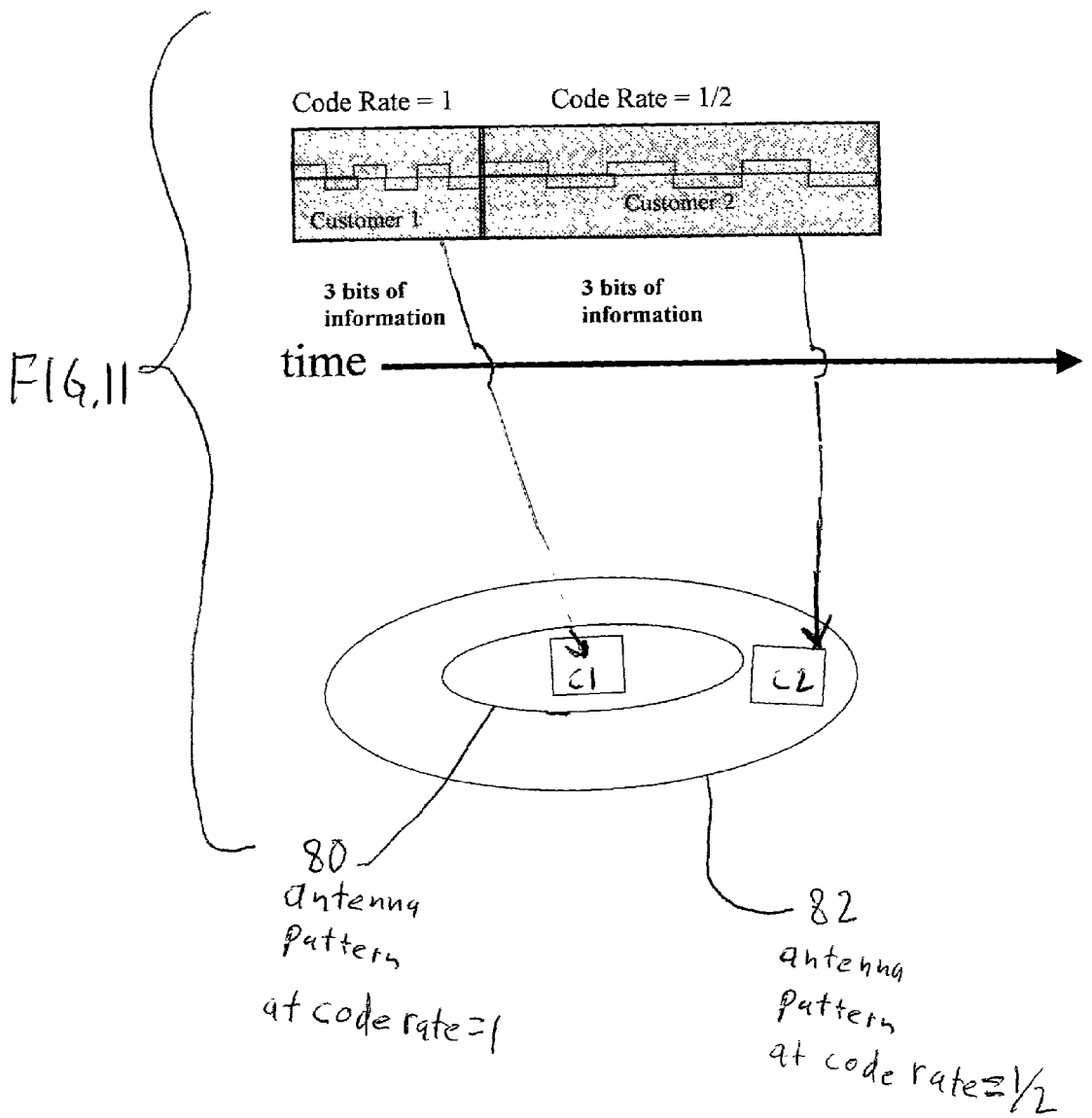
FIG. 11 is a simplified illustration showing two TDM subchannels, corresponding users, and corresponding coverage areas.

Turning now to FIG. 11, a further aspect of the invention will be explained. The top of FIG. 11 represents subchannels as explained with respect to FIG. 4, whereas the lower part of FIG. 11 is a highly schematic illustration of the location of two customers. The antenna of the satellite (not shown) would transmit an acceptable power level to circle 80 (shown as an oval due to angle of view) on the earth if transmitting at code rate=1. Therefore, customer one C1 can receive the signal at that code rate. However, customer C2 is outside of circle 80 and, absent a larger satellite dish, would not be able to adequately receive the signal at code rate=1. By using code rate=½ for the TDM subchannel used for customer C2, that customer can receive the signal at an acceptable level. Thus, the effective coverage area of the antenna can be increased to circle 82 by using the adjustment in code rates.

Figure 12:
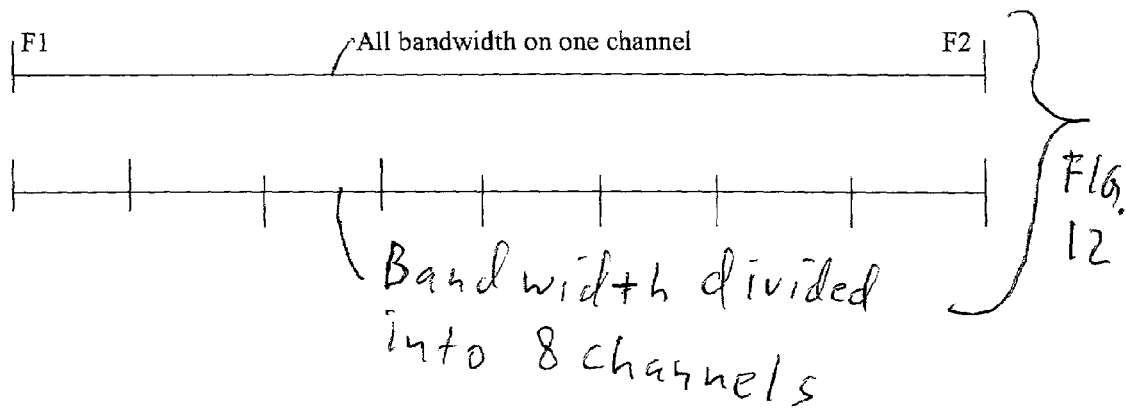
FIG. 12 shows how a bandwidth may be allocated to one channel or more than one channel.
Figure 13:
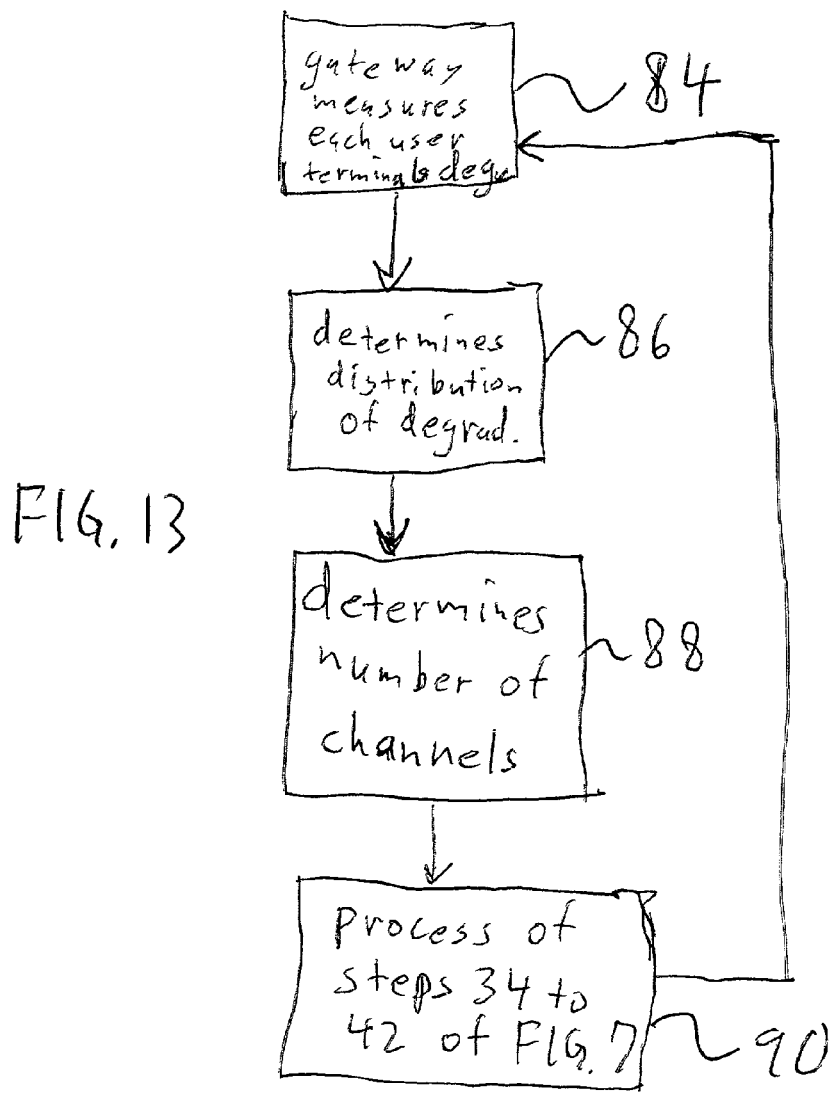
FIG. 13 is a simplified flow chart illustrating a feature of the present invention where the number of channels is variable.

FIGS. 12 and 13 relate to a further aspect of the invention where the number of channels depends on the conditions. Under good, clear sky conditions all of the bandwidth between F1 and F2 may be allocated to a single channel as shown in the top of FIG. 12. When conditions are not as good, the same bandwidth may be allocated to, for example, 8 channels as shown in the bottom of FIG. 12. As shown at FIG. 13, block 84 determines the various signal degradations of the users. At block 86, a distribution of the signal degradations is determined. This is then used by block 88 to determine the number of channels using the given bandwidth. When conditions are especially poor, more channels will be used. At block 90, the process of blocks 34 to 42 of FIG. 7 will be performed before returning to block 84 which periodically checks to best allocate the bandwidth.

The gateway and satellite may be considered, collectively or individually (i.e., each), communication centers. Although the preferred embodiment involves satellite transmission, the present invention may also be used with a terrestrial communication center or other communication center that transmits directly to users where signal degradation may vary significantly between the users.

Significantly, the adjustment for signal degradation between the various TDM subchannels is accomplished in the present invention without changing the transmission signal constellations to adapt to changing transmission conditions. In other words, the present invention would preferably use a signal constellation which does not change. Further, the present invention does not involve excess time slot capacity that is only used under difficult conditions. Instead, the full time slot capacity is always used, but is reallocated depending on conditions. In other words, the preferred embodiment of the present invention does not have a pool of TDMA time slots set aside only for use in difficult conditions.

Note that the preferred embodiment shows transmission being from a satellite via downlinks to various users. However, a communications center other than a satellite might be used. Additionally, the technique of the present invention including multiple band load balancing could be used for communications from various users to a communications center, such as by uplinks from the users to a satellite. In that case, all users might be connected to a central hub that would allocate their subchannel assignments as necessary, but other possible ways of coordinating subchannel assignments among the geographically distributed users could be used. Further, and depending on the type of service provided for the users, the load balancing and related techniques described herein could be used for both communications from a communications center to users and from the users to the communications center. In the case where the communications center is a satellite, the uplinks and downlinks corresponding to the users would be changed using the present techniques.

It should be noted that components 60 and 62 in FIG. 9 and 72 and 74 in FIG. 10 may be realized by microprocessors or other central processing units (CPUs) that are programmed to perform the various functions and control the associated transmitter portions of the associated transceivers. Also, components 72 and 74 could in theory at the satellite and interface directly with the transmitter portions of the various transponders (64 in FIG. 9).

Although specific constructions have been presented, it is to be understood that these are for illustrative purposes only. Various modifications and adaptations will be apparent to those of skill in the art. Therefore, the scope of the present invention should be determined by reference to the claims.

What is claimed is:

1. A method of balancing a load in transmission on a plurality of channels between a satellite and a plurality of users to take into account variations in signal degradation, the method comprising:
   transmitting signals between the satellite and the users in a series of time-division multiplex (TDM) subchannels which collectively make up a frame, each frame corresponding to one of the channels, each channel having a plurality of the subchannels, each subchannel constituting a link with a signal, each subchannel having a different code rate than the other of the plurality of the subchannels, and, at a given time, each TDM subchannel having an associated packet length, code rate, and symbol rate;
   determining the signal degradation associated with each TDM subchannel being used for a corresponding one of the users, the signal degradation for a given TDM subchannel being dependent on a corresponding path between a satellite and the corresponding one of the users;
   changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the channels; and
   dropping any user TDM downlink subchannel having a signal degradation greater than a limit and reassigning the packet length(s) associated with any dropped downlink to TDM subchannels corresponding to still active downlinks;
   said signals being transmitted from the satellite to the users via downlink paths, each using a downlink TDM subchannel.

2. The method of claim 1 wherein the transmitting uses the same symbol rate for all subchannels within a channel at any given time.

3. The method of claim 1 further comprising:
   selecting the number of channels and their symbol rates necessary to overcome the range of signal fade degradations in an environment and determining the number of channels and the symbol rates so that each TDM subchannel within a channel can adjust their packet length to accommodate a code rate change at a desired level of quality in those TDM subchannels.

4. The method of claim 1 further comprising adjusting the symbol rates for the channels dependent on the signal degradations, selecting one or more TDM subchannels for adjustment dependent on the determined signal degradation for the TDM subchannels; and adjusting the TDM subchannels within each channel, and wherein the adjusting includes decreasing the code rate and increasing the packet length of one or more TDM subchannels as needed to maintain a first desired level of quality in those TDM subchannels, the increased packet lengths being obtained by decreasing packet lengths in other TDM subchannels, which TDM subchannels can accommodate the decreased packet lengths without falling below a second desired level of quality.

5. The method of claim 4 wherein the increasing the packet length is performed in conjunction with decreasing the corresponding code rate(s) and wherein the decreasing the packet length is performed in conjunction with increasing the corresponding code rate(s).

6. The method of claim 5 further comprising the adjusting the symbol rate for each channel depending on the signal degradations.

7. The method of claim 6 wherein the transmitting uses the same symbol rate for all subchannels within a channel at any given time.

8. The method of claim 7 wherein each channel has a corresponding degradation range that is fixed.

9. The method of claim 7 wherein each channel has a corresponding degradation range that is adjusted dependent on signal degradations.

10. A method of balancing a load in transmission on a plurality of channels between a satellite and a plurality of users to take into account variations in signal degradation, the method comprising:
   transmitting signals between the satellite and the users in a series of time-division multiplex (TDM) subchannels which collectively make up a frame, each frame corresponding to one of the channels, each channel having a plurality of the subchannels, each subchannel constituting a link with a signal, and, at a given time, each TDM subchannel having an associated packet length, code rate, and symbol rate; determining the signal degradation associated with each TDM subchannel being used for a corresponding one of the users, the signal degradation for a given TDM subchannel being dependent on a corresponding path between a satellite and the corresponding one of the users;
   changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the channels; and selecting one or more TDM subchannels for adjustment dependent on the determined signal degradation for the TDM subchannels; and adjusting the TDM subchannels within each channel, by increasing the packet length of the one or more TDM subchannels as needed to maintain a first desired level of quality in those TDM subchannels, the increased packet lengths being obtained by decreasing packet lengths in other TDM subchannels, which TDM subchannels can accommodate the decreased packet lengths without falling below a second desired level of quality.

11. A method of balancing the load in transmission on a plurality of channels between a communication center and a plurality of users to take into account variations in signal degradation associated with each of the users, the method comprising:

transmitting signals between the communication center and the users in a series of time-division multiplex (TDM) subchannels which collectively make up a frame, each frame corresponding to one of the channels, each channel having a plurality of the subchannels, each TDM subchannel constituting a link with a signal and associated with at least a corresponding one of the users at a given time, and, at a given time, each TDM subchannel having an associated packet length, code rate, and symbol rate;

determining the signal degradation associated with each TDM subchannel being used for the corresponding one of the users, the signal degradation for a given TDM subchannel being dependent on a corresponding link path; and changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates and different code rates on the channels; and selecting one or more TDM subchannels for adjustment dependent on the determined signal degradation for the TDM subchannels; and the adjusting includes increasing the packet length of one or more TDM subchannels as needed to maintain a first desired level of quality in those TDM subchannels, the increased packet lengths being obtained by decreasing packet lengths in other TDM subchannels, which TDM subchannels can accommodate the decreased packet lengths without failing below a second desired level of quality.

12. The method of claim 11 wherein each channel has a corresponding degradation range that is fixed.

13. The method of claim 11 wherein each channel has a corresponding degradation range that is adjustable dependent on the signal degradations.

14. The method of claim 11 wherein the communication center is a satellite; and the transmitting is transmission from the satellite to the plurality of users.

15. The method of claim 14 further comprising adjusting the symbol rates for the channels dependent on the signal degradations.

16. A method of balancing a load in transmission on a plurality of channels between a communication center and a plurality of users to take into account variations in signal degradation associated with each of the users, the method comprising:

transmitting signals between the communication center and the users in a series of time-division multiplex (TDM) subchannels which collectively make up a frame, each frame corresponding to one of the channels, each channel having a plurality of the subchannels, each subchannel constituting a link with a signal and corresponding at a given time with at least one of the users, and, at a given time, each TDM subchannel having an associated packet length, code rate, and symbol rate;

determining the signal degradation associated with each TDM subchannel being used for the corresponding one of the users, the signal degradation for a given TDM subchannel being dependent on a corresponding link path between the communication center and the corresponding one of the users;

changing assignment of the users to the channels based on the signal degradations with users grouped together on a channel when their signal degradations are within a degradation range corresponding to the channel, there being a signal degradation range corresponding to each of the channels at a given time, each user being assigned to a corresponding subchannel within that user's corresponding channel, there being different symbol rates on the channels;

determining the optimal symbol rate for each of the channels based on the determined signal degradations; and transmitting signals between the communication center and the users in the TDM subchannels using the symbol rates determined for each of the channels, the symbol rates for all TDM subchannels in a channel being equal at a given time.

17. The method of claim 16 wherein the communication center is a satellite.

18. The method of claim 17 wherein the transmitting is transmission from the satellite to the plurality of users.

19. The method of claim 18 further comprising selecting one or more TDM subchannels for adjustment dependent on the determined signal degradation for the TDM subchannels; and wherein the adjusting includes increasing the packet length of one or more TDM subchannels as needed to maintain a first desired level of quality in those TDM subchannels, the increased packet lengths being obtained by the decreasing packet lengths in other TDM subchannels, which TDM subchannels can accommodate the decreased packet lengths without failing below a second desired level of quality.

20. The method of claim 19 further including dropping any link having a signal degradation greater than a limit and reassigning the packet length(s) associated with any dropped link to TDM subchannels corresponding to still active links.

21. The method of claim 19 further comprising adjusting packet lengths of subchannels within each channel based on the signal degradations of the subchannels.

* * * * *